United States Patent [19]
Tsen et al.

[11] 3,773,521
[45] Nov. 20, 1973

[54] SHORTENING SPARING PROCESS FOR WHEAT FLOUR BASED BAKED OR FRIED DOUGH PRODUCTS AND DOUGHS PRODUCED THEREBY

[75] Inventors: Cho C. Tsen; William J. Hoover, both of Manhattan, Kans.

[73] Assignee: Kansas State University Research Foundation, Manhattan, Kans.

[22] Filed: Oct. 5, 1970

[21] Appl. No.: 78,237

[52] U.S. Cl. .............................................. 426/343
[51] Int. Cl....... A21d 2/16, A21d 2/26, A21d 13/06
[58] Field of Search ..................... 99/91, 86, 90 HP, 99/80, 83, 92

[56] References Cited
UNITED STATES PATENTS
2,733,252   1/1956   Thompson et al.................. 99/91 X OTHER PUBLICATIONS
Pyler (editor), "Baking Science and Technology," Vol. II, 1952, pages 759, 767.

Tenney et al., "Sodium Stearoyl-2 Lactylate," The Bakers Digest, Vol. 42, Dec. 1968, pages 38–42.

Primary Examiner—Raymond N. Jones
Assistant Examiner—James Robert Hoffman
Attorney—Schmidt, Johnson, Hovey & Williams

[57] ABSTRACT

A method of decreasing or completely eliminating the shortening normally required in yeast or chemically leavened wheat flour based bread, baked or fried dough or batter products by incorporating in the dough or batter in lieu of the shortening omitted, from 0.1 to 3 percent flour weight of an additive selected from the group consisting of sodium or calcium salts of acyl lactylates of $C_{14}$–$C_{22}$ fatty acids. The preferred additives are sodium stearoyl-2-lactylate or calcium stearoyl-2-lactylate each added at a concentration of 0.5 percent.

2 Claims, No Drawings

SHORTENING SPARING PROCESS FOR WHEAT FLOUR BASED BAKED OR FRIED DOUGH PRODUCTS AND DOUGHS PRODUCED THEREBY

This invention relates to a process for decreasing or completely eliminating the shortening normally required in yeast or chemically leavened wheat flour based bread, baked or fried dough or batter products by incorporation of an additive in the dough or batter and preferably comprising a salt of acyl lactylates of $C_{14}$–$C_{22}$ fatty acids thus permitting production of the baked or fried goods at a lower cost because the additive at an effective concentration costs substantially less than the shortening normally required in products of this type. If desired, the process also lends itself to introduction of protein supplements into the dough or batter formulation without adversely affecting the quality of the baked or fried goods produced therefrom, thus significantly increasing the nutritional value of the food products.

Wheat flour based bread, baked or fried goods are staple foods in many countries of the world because of their relatively high caloric value, ready availability of wheat flour at an economical price, and the attractive organoleptic and appearance properties of the food products. Bread dough typically contains flour, water, salt, yeast, sugar, shortening, and dough conditioning agents. Frequently milk or milk solids are added. Normally, about 3 percent of shortening based on the flour weight of the bread formulation is required to produce a satisfactory final baked bread product. Although the physical and chemical properties of shortening as an ingredient of bread are not fully understood, it is believed that the shortening improves the ability of the dough to entrap and hold air during mixing as well as subsequent rise of the product during proofing and handling thereof to assure a loaf of maximum volume upon baking. In addition, the shortening facilitates handling of the dough during mixing, extension and proofing thereof, favorably affects the organoleptic properties of the product including enhancement of flavor, texture, and grain, and contributes to a more uniform crumb size. For the most part, semisolid or viscous shortenings have been found to give better properties than liquid products such as vegetable oils.

In the case of fried dough products such as doughnuts, sweet goods such as sweet rolls, cakes, and similar foods the amount of shortening required to give a satisfactory product in conjunction with the increased level of sugar in the formulation, again is a significant cost factor in these baked or fried goods by virtue of the fact that the shortening is many times more expensive than the wheat flour base material.

In addition, it is desirable to increase the nutritional content of the bread and other wheat flour based foods, particularly from a protein standpoint. However, attempts to incorporate protein supplements into wheat flour based food products have not heretofore met with success, particularly in conjunction with an attempt to simultaneously decrease the shortening level of the dough formulations. Soy flour for example is an especially attractive protein supplement for flour based baked products such as bread, biscuits or rolls, cakes, sweet goods, and fried products such as doughnuts, because of the high content of good nutritional quality of protein in soy flour. Also, soy flour is available at a sufficiently economical price with respect to the cost of wheat flour, to permit substitution of soy flour for a part of the wheat flour normally introduced as an ingredient of the dough composition.

Soy flour is especially valuable as an additive for flour based baked or fried dough or batter products not only because of its high protein content but also by virtue of the fact that it contains 3.2 to 3.8 percent lysine as compared with 0.375 percent in wheat flour. Thus, with the addition of 12 grams of soy flour to 100 grams of wheat flour the lysine content of this mixture will be more than doubled to a value of from 0.76 to 0.83 percent. The resulting product provides an exceptional vehicle for nutritional improvement of human diet.

Supplementation of the protein content of wheat flour based bread, baked or fried dough or batter products to a level to significantly improve nutrition has not heretofore been successful because of the adverse affect on the quality of the food product attributable to the supplement added, not only from the organoleptic standpoint, but also the appearance, physical quality and shelf life of the baked goods. These properties further decrease when efforts are made to limit the shortening content of the dough formulation. In order for shortening sparing and protein supplementation to be commercially practical, the additive permitting these objectives to be carried out must be economical, uniform in quality and not significantly change the bread making or baked or fried product producing properties of the dough or batter with little or no adjustment in the overall formula. Finally, the additive and the protein supplement as well should not alter or impair the quality of the bread, or baked or fried dough or batter product.

It has now been discovered that by incorporation of from 0.1 to 3 percent of either the sodium or calcium salts of acyl lactylates of $C_{14}$–$C_{22}$ fatty acids (preferably sodium stearoyl-2-lactylate or to a slightly lesser degree calcium stearoyl-2-lactylate) in the bread, baked or fried goods dough or batter, not only may the shortening required in the formulation be decreased or the shortening completely eliminated if desired, but at the same time, a protein supplement may be added to the composition in amounts to improve the nutritive quality of the wheat flour based baked or fried products without a subsequent loss in final product volume or deleterious affect on the organoleptic characteristics of the goods. The term "dough" as used herein means a kneadable flour based mixture such as bread dough while "batter" refers to a flour based mixture of greater fluidity such as cake batter which does not tend to maintain its shape when unsupported. Incorporation of an additive such as sodium stearoyl lactylate or calcium stearoyl lactylate in the dough which permits the shortening level in fried dough products such as doughnuts, sweet goods such as rolls, and cakes to be significantly lowered (as much as three-fourths in most instances) and for the shortening to be completely eliminated from baked products such as bread and rolls, results in a net decrease in the overall cost of the products by virtue of the fact that the additive is effective at a level where the cost thereof is substantially less than the price of shortening at levels normally required in the dough or batter with any one or more of a number of protein additives may be carried out if desired to increase the nutritional content of the baked or fried goods. Examples of usable protein supplements include soy flour, soy isolates, nonfat milk solids, whey products, fish protein concentrates, cottonseed flour, chickpea flour, seasame seed flour, corn-soy-milk blend flour, wheat protein concentrate, wheat gluten, defatted wheat germ, Torula yeast, wheat soy blend flour, edible single cell proteins compatible with wheat flour for baking purposes, and mixtures thereof. Generally speaking, the quantity of protein supplement added need not significantly exceed that required to furnish a quantity of protein essentially equal to the quantity of protein provided by the wheat flour content of the dough.

It is therefore the primary object of this invention to provide a unique process for substantially lowering or even completely eliminating shortening from wheat flour based bread, baked or fried dough or batter products by addition of a lactylate additive which in the quantities used costs less than the shortening omitted and serves the added function of allowing a protein supplement to be introduced into the formulation without changing the desirable properties of the food product.

It is a further important object of the invention to provide a method of eliminating or decreasing the shortening requirements of wheat flour based bread, baked or fried dough or batter products which may be carried out without altering in any way the processing conditions required for preparation of the food product therefrom, in the baking or frying processes themselves, or in the equipment needed for mixing the processing of the dough or batter.

As a corollary to the foregoing object, it is an important aim of the invention to provide a novel method for decreasing or eliminating the shortening normally required in bread dough and similar products as well as to permit introduction of protein supplements into the formulation in a manner which is equally applicable to straight dough, short-time dough, no-time dough, sponge dough or continuous dough bread making processes without significant alteration if any of the conventional sequence of steps involved therein.

In accordance with the preferred concepts of the present invention, incorporation of from 0.1 to 3 percent of either the sodium or calcium salts of acyl lactylates of $C_{14}$–$C_{22}$ fatty acids based on the total weight of wheat flour in a wheat flour based bread, baked or fried dough or batter product, permits the shortening normally required in the formulation to be significantly decreased and even eliminated in products such as bread, rolls, biscuits or crackers and allows the shortening content to be reduced at least about three-fourths in sweet goods such as doughnuts and sweet rolls which normally must be provided with a relatively high shortening content. In addition, a nonwheat or wheat protein supplement may be added to the dough or batter to increase the nutritional value of the food product. The amount of protein supplement added may be as high as that which provides a quantity of protein approximately equal to the protein content of the wheat flour. Best results are obtained when sodium stearoyl-2-lactylate is used as the additive at a concentration of 0.5 percent baker's weight (parts by weight of additive for each 100 parts by weight of wheat flour in the dough formulation). Calcium stearoyl-2-lactylate is equally usable in lieu of the sodium salt although in certain instances, a somewhat larger relative amount thereof as compared with the optimum quantity of sodium stearoyl-2-lactylate, may be necessary to obtain equivalent shortening sparing, and assurance of equal quality in the final product if a significant amount of a protein supplement is added to the dough. Although as explained, the discovery that addition of prescribed amounts of a lactylate additive such as sodium stearoyl lactylate or calcium stearoyl lactylate is useful as a shortening sparing agent in various types of wheat flour based bread, baked and fried dough products and serves the related function of permitting significant protein supplementation of the bread, the effectiveness of the additive can best be illustrated with respect to bread formulations because of the ease with which the products can be produced, the wide range of standard comparative tests which can be employed to show the value of introducing the additive into the bread dough as compared with similar formulations without the additive, the simple way in which the optimum use concentrations thereof can be established, and the reproducible nature of the tests for vertification purposes. It is to be understood though that the specific formulas and tests referred to hereunder are not to be construed as limiting the applicability of the lactylate additive to bread, but instead should be interpreted as exemplary of one type of a large number of wheat flour based baked or fried dough goods which can be produced in accordance with the concepts hereof.

Bread dough is usually made up of relatively simple ingredients including wheat flour, salt, yeast, sugar, shortening, a dough conditioner (usually an oxidizer) and water. In a typical formula, for each 100 parts of wheat flour, two parts of yeast, five parts of sugar, 0.5 part of a yeast food containing potassium bromate, two parts of salt and three parts of shortening are combined with the necessary amount of water to produce a plastic dough. It has now been discovered that by incorporation of from 0.1 to 3 percent (preferably 0.5 percent) of sodium stearoyl lactylate or calcium stearoyl lactylate in the formulation, the shortening normally included in the dough can be completely eliminated with the final product being of equivalent quality to a normal bread containing shortening. The specific loaf volume of loaves prepared from a formula containing the lactylate additive and no shortening are actually greater than shortening containing breads. In addition, if desired, a protein supplement may be introduced into the bread dough as an additive thereto or the wheat flour normally provided in the bread replaced in its entirety by a protein supplement. Use of from 0.1 to 3 percent of either the sodium or calcium salts of acyl lactylates of $C_{14}$–$C_{22}$ fatty acids permits incorporation of a wide range of protein additives at various levels of addition, in the bread, baked or fried goods dough with the amount of lactylate required being somewhat dependent upon the amount of shortening to be deleted from the formulation, and the quantity of protein additive desired to be added to the dough. In most instances though, utilization of the preferred amount of lactylate additive, i.e., 0.5 percent (baker's weight) is adequate to permit deletion of all shortening from bread formulations and substantial lowering of the shortening content of sweet goods, while at the same time permitting addition of a protein supplement in an amount to provide an absolute protein content approximately equal to the absolute protein value of the wheat flour normally provided in the product.

When bread is prepared by the standard sponge dough method as prescribed by the American Association of Cereal Chemists using a formula comprising in parts by weight, 100 parts of wheat flour, two parts of yeast, five parts of sugar, 0.5 part of a yeast food containing an oxidizing agent such as potassium bromate (for example Arkady yeast food), two parts of salt and 0.5 part of sodium stearoyl-2-lactylate, the resulting bread product compares very favorably with bread made from the same formula with three parts of shortening added to the dough in lieu of the lactylate additive.

Baking tests have established that the specific volume of a loaf of bread made from the standard bread formulation above containing 0.5 percent (baker's weight) of sodium stearoyl-2-lactylate and no shortening, is 6.64 whereas a loaf prepared from the standard formulation with 3 percent shortening and no lactylate additive, the specific loaf volume is only 6.52.

It is common practice in the baking industry to regard "specific loaf volume" as an important parameter for gauging the marketability of bread. A marketable bread should have a specific volume over 6.00 cc/g., provided it also has acceptable appearance, crumb texture, grain and organoleptic properties. Since the quality of bread made from a formula including a preferred amount of the lactylate additive and no shortening compares favorably with that of bread containing shortening, it is apparent that the overall cost of the bread can be materially decreased since the lactylate additive at optimum concentration is much less expensive than three parts of shortening in the same bread formulation.

If the level of sodium stearoyl lactylate or calcium stearoyl lactylate is limited to about 0.25 percent, a complementary action is found between the lactylate additive and shortening when 1 to 2 percent of shortening is used in the standard bread formulation set forth above in lieu of shortening at a normal 3 percent level. Baking tests with the standard bread formulation specified with the exception of variation of the concentration of lactylate additive and shortening level as set forth in the table hereunder, show that the specific loaf volume varies somewhat with the amount of lactylate added as well as the quantity of shortening in the formulation, but that in each instance where at least about 1/4 percent of the lactylate is used in conjunction with shortening at a level as low as 1/3 of that normally employed (1 percent), or the lactylate used in a concentration of 1/2 percent and no shortening is employed, the specific loaf volume of the bread exceeds the standard normally used as a minimum for a marketable product:

TABLE I

| Sodium Stearoyl-2-Lactylate | Shortening Content | Specific Loaf Volume |
|---|---|---|
| 0.25% | 0% | 6.54 |
| 0.25% | 1% | 6.72 |
| 0.25% | 2% | 6.92 |
| 0.5% | 0% | 6.64 |
| 0.5% | 1% | 6.64 |
| 0.5% | 2% | 6.82 |
| 0% | 3% | 6.52 |
| 0% | 0% | 6.14 |

Compressimeter readings of loaves containing 0.5 percent sodium stearoyl-2-lactylate and no shortening as compared with bread prepared from the standard formulation described and containing the normal amount of shortening with no lactylate added. For example, a loaf made with 3 percent shortening and no lactylate additive was found to give the following compressimeter readings in grams: at completion of bake — 21; one day — 64; three days — 116; and five days — 115. These readings are to be compared with a loaf made with 0.5 percent sodium stearoyl-2-lactylate and no shortening which gave the following compressimeter readings in grams: at completion of bake — 40; one day — 62; three days — 81; and five days — 112.

The effectiveness of adding sodium stearoyl lactylate or calcium stearoyl lactylate to bread doughs containing a protein supplement can also be demonstrated by adding 12 percent (baker's weight) of soy flour to a standard bread formulation as specified containing 100 parts of wheat flour, two parts of yeast, five parts of sugar, 0.5 part of a commercial yeast food and oxidizer, two parts of salt and either three parts of shortening in one batch, or 0.5 part of sodium stearoyl-2-lactylate in another batch. In this instance, baking tests established that the control bread containing three parts of shortening but no lactylate additive had a specific loaf volume of 5.75. Loaves baked from the batch containing 0.5 percent sodium stearoyl-2-lactylate but no shortening had an average specific loaf volume of 6.38. This is to be compared with a loaf prepared from the standard bread formulation described minus shortening as well as the lactylate additive and which had a specific loaf volume of 5.38.

The complementary action between a lactylate additive such as sodium stearoyl-2-lactylate and shortening in standard bread formulations when 1 percent or 2 percent of shortening is added instead of the normal 3 percent and wherein the bread dough is provided with 12 percent soy flour as a protein supplement therein, is demonstrated by the following table:

TABLE II

| Sodium Stearoyl-2-Lactylate | Shortening Content | Specific Loaf Volume |
|---|---|---|
| 0% | 0% | 5.38 |
| 0.25% | 0% | 5.63 |
| 0.25% | 1% | 6.34 |
| 0.25% | 2% | 6.25 |
| 0.50% | 0% | 6.38 |
| 0.50% | 1% | 6.22 |
| 0.50% | 2% | 6.26 |

Not only is bread produced with sodium stearoyl lactylate or calcium stearoyl lactylate as an additive in lieu of shortening more economical and with equivalent organoleptic properties and physical characteristics to conventional shortening containing bread, but it is to be recognized that the bread prepared with the lactylate additive without shortening has a lower caloric value. Thus, the caloric value of 3 percent shortening can be decreased about 92.7 percent if 0.25 percent of sodium stearoyl-2-lactylate is used in place thereof, and about 83.4 percent if the shortening is replaced by 0.50 percent of the lactylate.

A typical fried dough product such as doughnuts of the yeast raised type conventionally include 100 parts of flour, six parts of yeast, two parts of dried whole powdered egg solids, two parts of salt, and eight parts of sugar. Baking tests have demonstrated that when 0.1 to 3 percent and preferably about 0.5 percent of sodium stearoyl-2-lactylate or calcium stearoyl-2-lactylate is added to the doughnut dough formulation, the shortening requirement can be decreased from a normal eight parts to preferably no more than about two parts. Although the shortening can be eliminated completely from the formula, best results are obtained when about one-fourth of the normal shortening is employed in the dough. In addition, baking studies have establshed that eight parts of soy flour, or to an equal extent, eight parts of nonfat milk solids as a protein supplement may be added to the doughnut composition without affecting the quality of the product from an organoleptic standpoint as well as the physical and chemical characteristics thereof.

In chemically leavened baked goods such as cakes containing relatively large amounts of shortening, the lactylate additive can also be used to limit the amount of shortening required in the dough. For example, in a conventional white cake formula which normally contains 55 percent (baker's weight) of shortening, it has been demonstrated by baking tests that upon addition of 1 percent (baker's weight) of sodium stearoyl-2-lactylate, the shortening can be reduced to a level of 45 percent and the resulting cake has a better rating than the control cake containing 55 percent shortening and no lactylate additive. Addition of 1 percent of the sodium stearoyl-2-lactylate to a cake formulation as described containing 40 percent shortening resulted in a baked product as good as the control cake. These comparative tests demonstrate that wheat flour based baked or fried dough products chemically leavened with an agent such as commercial baking powder exhibit the same characteristics as yeast leavened products upon addition of the specified lactylate additive.

It has been further demonstrated that a wheat protein concentrate supplemented wheat flour known commercially as "Blend A" can be used in place of wheat flour to produce bread, baked or fried dough products from which the shortening has either been omitted or significantly decreased without deleterious effects on product volume, appearance, crumb texture, grain or taste so long as 0.1 to 3 percent and preferably 0.5 percent of the sodium or calcium salts of acyl lactylate of $C_{14}$–$C_{22}$ fatty acids are added to the formulation. Best results are obtained when either sodium stearoyl-2-lactylate or calcium stearoyl-2-lactylate are used as the additive. Blend A flour is composed of 30 percent wheat protein concentrate and 70 percent straight flour as these terms are set forth in the Definitions and Standards of Identity of wheat flour as defined under the Food, Drug and cosmetic Act.

|  | Minimum | Maximum |
|---|---|---|
| Moisture |  | 14.0% |
| Protein (Nx5.7) 1/ | 11.0% |  |
| Ash 1/ |  | .48% |
| Falling Number 1/ | 200 | 300 |

1/ These limiting values are on a 14.0% moisture basis.

The wheat protein concentrate shall be obtained by fine grinding and shifting of total mill run middlings, or fraction thereof. The middlings shall contain no screenings. The concentrate shall conform to the following chemical requirements:

|  | Minimum | Maximum |
|---|---|---|
| Moisture |  | 13.0% |
| Protein (Nx6.25) | 20.0% |  |
| Ash 1/ |  | 4.8% |
| Crude Fiber 1/ |  | 3.0% |
| Crude Fat 1/ | 4.0% |  |
| Lysine 1/ | 0.9%* |  |

1/ These limiting values are on a 14.0% moisture basis.
* 0.5% lysine minimum remains for the final product.

Blend A flour is also generally fortified with vitamins and minerals such as Vitamin A and calcium carbonate and the finished product must conform to the following chemical and physical requirements:

|  | Minimum | Maximum |
|---|---|---|
| Moisture |  | 13.0% |
| Protein (Nx5.7) 1/ | 13.5% |  |
| Ash 1/ |  | 2.8% |
| Crude Fiber 1/ |  | 2.0% |
| Crude Fat 1/ | 1.8% |  |
| Lysine 1/ | 0.5% |  |
| Bromate, PPM 2/ | 100 | 125 |
| Through U.S. Standard No. 20 Sieve | 97% |  |

1/ These limiting values are on a 14.0% moisture basis.
2/ (Parts Per Million) AACC Method 48-42.

An almost limitless number of blends or premixes combining wheat flour and protein supplements for use in combination with the shortening sparing concepts of this invention, particularly from the standpoint of the quantity of supplement added or substituted for wheat flour. For most purposes though, it is preferred that the amount of protein rich additive added to the bread, baked or fried dough or batter composition be at a level to provide an amount of protein in the finished product of at least approximately 2 percent. Normally it is not essential to go above about 12 percent by weight of protein added to the final bread, baked or fried dough or batter goods for adequate supplementation of the total protein of the products from a nutritional standpoint.

Sodium stearoyl-2-lactylate is generally prepared by admxing lactic acid in an aqueous medium to commercial grade stearic acid (an admixture of myristic, palmitic and stearic fatty acids) at a sufficiently elevated temperature to remain in a molten condition. In general, 1.0 equivalent of fatty acid is used for 1.2 equivalents of lactic acid as monomer for each lactyl group desired. In this case therefore, 2.4 equivalents of lactic acid are provided for each 1.0 equivalent of fatty acids. The mixture is stirred with heating whereupon about 1 equivalent of sodium hydroxide is added. The mixture is then heated to bring the temperature thereof up to about 200° C. to complete the reaction. The reaction is carried out under an atmosphere of an inert gas to remove water vapor and prevent oxidation of the stearic acid. A solid, slightly cream colored material is produced upon cooling of the reaction products and it is then ground to a fine powder for use. The powder is a mixture of sodium salts of a homologous series of stearoyl lactylic acids, in which the number of lactyl groups in the molecule is a function of the relative ratios of the constituents brought into admixture. Calcium stearoyl-2-lactylate is prepared in a similar manner except that calcium carbonate is used as the neutralization agent.

The respective reaction mixtures will contain unreacted lactic acid and lactylates, unreacted stearic acid, polylactylates and their salts. A specific procedure for producing sodium stearoyl-2-lactylate of which the numeral 2 dicates the average number of lactyl groups in the molecule, is set forth in detail in U. S. Pat. No. 2,789,992 insofar as stearoyl-2-lactylic acid ester is concerned and U.S. Pat. No. 2,733,252 which describes not only the preparation of sodium stearoyl2-lactylate from stearic acid, sodium bicarbonate and lactylic acid, but also sets forth the parameters for production of the calcium lactylate composition. It is to be understood in this respect that although best results have been obtained by using sodium stearoyl-2-lactylate, and to a slightly lesser degree, calcium stearoyl-2-lactylate, other equivalent lactylates may be employed in this invention including those stearoyl lactylates, and particularly the sodium and calcium lactylates having a different average number of lactyl groups in the molecule than is the case in the preferred lactylate additives specified herein. For examle, the average number of lactyl groups can be less than 1.0 although a larger quantity of the additive must be employed for equivalent effectiveness. Specifications for the preferred acyl lactylate sodium stearoyl-2-lactylate are set forth in food additive regulation 21 CFR S 121.1211.

Although the specific baking tests referred to above with respect to the bread formulations were carried out according to the standard sponge dough test officially approved by the American Association of Cereal Chemists with only slight modifications therefrom, the baking results obtained are valid not only for the sponge dough method but also for the continuous mix, short-time, no-time, and straight dough methods.

Having thus described the invention, what is claimed as new and desired to be secured by Letters Patent is:

1. In a method of preparing a yeast or chemically leavened wheat flour based bread, baked or fried dough or batter product of the type wherein each selected product requires inclusion therein of a particular quantity of shortening for preparation of a satifactory product, the improvement comprising:
   admixing the ingredients making up the dough or batter of a selected product of said type, said ingredients being admixed without inclusion of shortening therewith; and
   incorporating into the dough or batter ingredients prior to baking or frying thereof in lieu of shortening omitted from the dough or batter, from 0.1 to 3 percent based on the weight of wheat flour content of the dough or batter, of an additive selected from the group consisting of sodium salts of acyl lactylates of $C_{14}$–$C_{22}$ fatty acids and calcium salts of acyl lactylates of $C_{14}$–$C_{22}$ fatty acids.

2. A method as set forth in claim 1, wherein about 0.5 percent by weight of said additive is incorporated with the dough or batter ingredients.

* * * * *